(12) United States Patent
Liu (10) Patent No.: US 7,777,905 B2
(45) Date of Patent: Aug. 17, 2010

(54) MIME TYPE-BASED PRINTER DRIVER SELECTION

(75) Inventor: Yue Liu, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1242 days.

(21) Appl. No.: 11/339,018

(22) Filed: Jan. 24, 2006

(65) Prior Publication Data

US 2007/0171448 A1 Jul. 26, 2007

(51) Int. Cl.
*G06F 3/12* (2006.01)
(52) U.S. Cl. .................... 358/1.15; 358/1.14; 358/1.16; 709/203; 709/219; 709/231
(58) Field of Classification Search ....... 358/1.14–1.16; 709/203, 219, 231
See application file for complete search history.

(56) References Cited

U.S. PATENT DOCUMENTS

| | | | |
|---|---|---|---|
| 6,727,998 B1 * | 4/2004 | Tomiyasu | 358/1.15 |
| 7,064,856 B2 * | 6/2006 | Fu et al. | 358/1.18 |
| 7,148,989 B2 * | 12/2006 | Hitaka | 358/1.16 |
| 7,162,103 B2 * | 1/2007 | Meunier et al. | 382/305 |
| 2002/0095351 A1 * | 7/2002 | Hitaka | 705/26 |
| 2005/0068564 A1 * | 3/2005 | Ferlitsch | 358/1.15 |

* cited by examiner

*Primary Examiner*—Chan S Park
(74) *Attorney, Agent, or Firm*—Hickman Palermo Truong & Becker LLP; Christian A. Nichol (57) ABSTRACT

A method for processing print data is disclosed. A particular data type for a print data stream is determined, based on data contained in the print data stream, from among a plurality of defined data types. It is determined whether there exists, within a plurality of printer drivers, a particular printer driver that is associated with the particular data type that was selected for the print data stream. If the plurality of printer drivers comprises a particular printer driver that is associated with the particular data type, then the print data stream is passed to the particular printer driver. The particular printer driver passes the print data stream toward a printing device without rendering the print data stream. The printing device is capable of understanding and processing the print data stream without such rendering being performed by any printer driver.

4 Claims, 6 Drawing Sheets

MIME TYPE-BASED PRINTER DRIVER SELECTION

FIELD OF THE INVENTION

The invention relates to printer drivers, to the printing sub-system of an operating system, and more specifically, to a technique for selecting, based on a Multipurpose Internet Mail Extensions (MIME) type associated with a file, one of a plurality of different printer drivers for printing the data in the file.

BACKGROUND OF THE INVENTION

Printing devices, such as printers and multi-function peripherals (MFPs) such as the Ricoh Aficio Color 6513 system, may come equipped with the native ability to understand and process commands from a multitude of different printing definition languages. For example, a printing device might comprise a Postscript interpreter, a Portable Document Format (PDF) interpreter, and different interpreters for different versions of Printer Control Language (PCL), such as a PCL5 interpreter and a PCL-XL interpreter. If a printing device comprises a Postscript interpreter, then print data that contains Postscript commands can be understood and processed by the printing device, for example.

Depending on the printing device, there may be some data types or printer definition languages that a printing device is not natively configured to understand. In such cases, a printer driver installed on a computer that sends print data to the printing device usually translates original print data, which is in a language that the printing device does not understand, into corresponding translated print data that is in a language that the printing device understands. For example, a Postscript printer might only come equipped with a Postscript interpreter and no other interpreter. If an application program attempts to send, to the Postscript printer, a print data stream that comprises non-Postscript commands, such as PDF commands, then a Postscript driver installed on the same computer as the application program first translates the PDF commands into corresponding Postscript commands, and then sends the translated print data stream on to the printing device.

Figure 1:
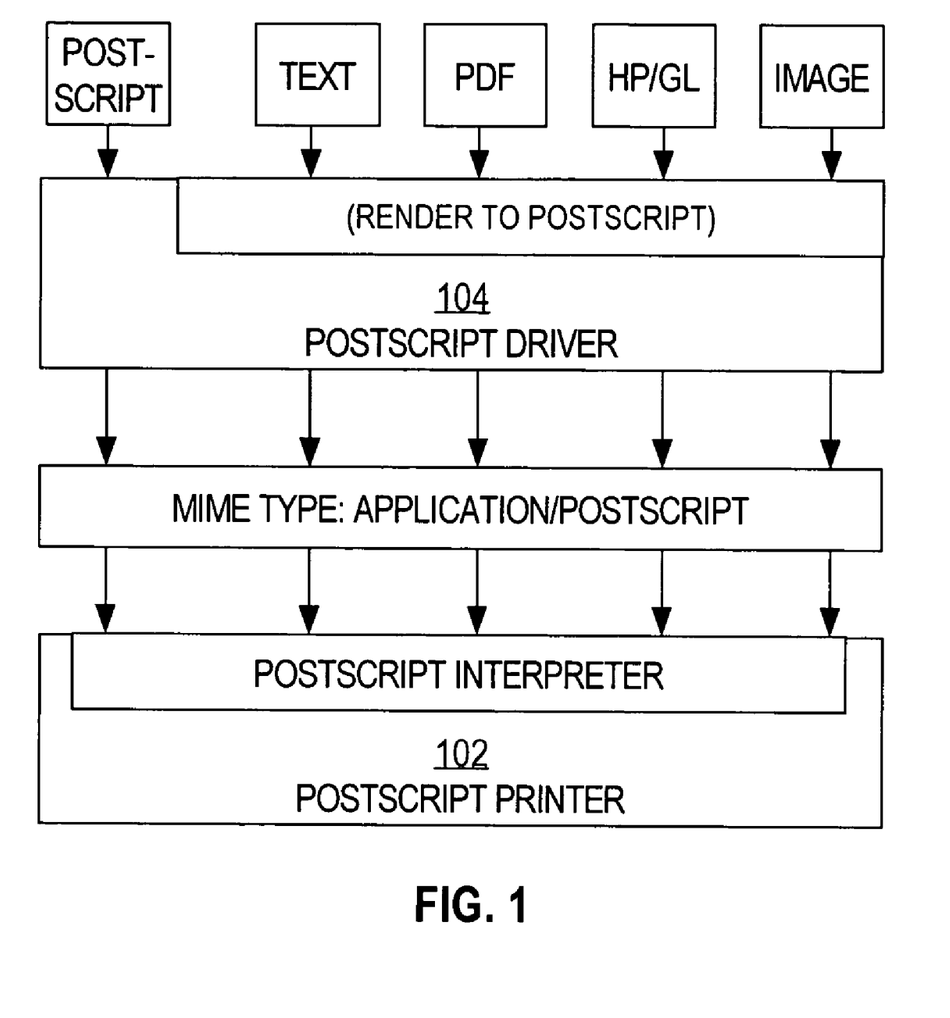
FIG. 1 is a block diagram that illustrates how a Postscript driver translates non-Postscript commands into Postscript commands for the benefit of a Postscript printer.

FIG. 1 is a block diagram that illustrates how a Postscript driver translates non-Postscript commands into Postscript commands for the benefit of a Postscript printer. In FIG. 1, Postscript printer 102 comes with the native ability to understand and process Postscript commands, but not non-Postscript commands such as those that might occur in a PDF file, for example.

As is shown in FIG. 1, all print data that is sent toward Postscript printer 102 is first received by Postscript driver 104. Postscript driver 104 inspects received print data and determines whether the print data is described in Postscript or in some other non-Postscript printer definition language. If Postscript driver 104 determines that the print data is described in Postscript, then Postscript driver 104 does not need to translate the print data. In this case, Postscript driver 104 sends the print data to Postscript printer 102 without performing any translation relative to the print data. However, if Postscript driver 104 determines that the print data is describer in a printer definition language other than Postscript (e.g., PDF), then Postscript driver 104 "renders" the print data into Postscript and then passes the rendered Postscript data along to Postscript printer 104.

It is a computationally expensive operation to translate print data from one printer definition language to another, and therefore should be avoided whenever possible. Such translation takes a significant amount of time. Additionally, the translation might also result in a loss of information. Unfortunately, unnecessary translation and rendering often occurs within existing systems. As is discussed above, many printing devices are natively equipped with the ability to understand and process multiple different printer definition languages. Despite these printing devices' diverse native capabilities, existing systems pass all print data through a printer driver for a single printer definition language. If the print data is in a language other than that which the printer driver produces, then the printer driver renders the print data even though the printing device could have understood and processed the print data in its original form.

For example, a printing device might comprise both a PDF interpreter and a Postscript interpreter. Such a printing device would be able to understand both PDF print data streams and Postscript print data streams. Nevertheless, if the printer driver installed on a computer that sends print data streams toward the printing device is a Postscript driver, then the printer driver will render all PDF print data streams into Postscript print data streams before passing the print data streams on to the printing device.

This is clearly a waste of the computer's processing resources. Based on the foregoing, there is a need for a way of avoiding the unnecessary translation and rendering of print data streams when those print data streams could be understood and processed by a printing device without any translation into a different printer definition language.

SUMMARY OF THE INVENTION

A method for processing print data is disclosed. In one embodiment of the invention, a particular data type for a print data stream is determined, based on data contained in the print data stream, from among a plurality of defined data types. It is determined whether there exists, within a plurality of different printer drivers, a particular printer driver that is associated with the particular data type that was selected for the print data stream. If the plurality of printer drivers comprises a particular printer driver that is associated with the particular data type, then the print data stream is passed to the particular printer driver. The particular printer driver passes the print data stream toward a printing device without rendering the print data stream. Under such circumstances, the printing device is capable of understanding and processing the print data stream without such rendering being performed by any printer driver.

Alternatively, if the plurality of printer drivers does not comprise a particular printer driver that is associated with the particular data type, then, in one embodiment of the invention, the print data stream is passed to a "default" or "preferred" printer driver. The default printer driver renders the print data stream into a printer definition language before passing the print data stream on to the printing device.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

According to one embodiment of the invention, the installation of a driver for a printing device involves the installation of a printer driver class for that printing device. The printer driver class for a printing device may comprise multiple printer drivers—a different printer driver for each different printer definition language that the printing device is able to understand. When the printer driver class is installed, a MIME-queue table is established and associated with the printing device; each different printing device may be associated with a different printer driver class and a different MIME-queue table.

The MIME-queue table indicates a set of defined and registered MIME types, such as Postscript, PDF, PCL5, PCL-XL, ASCII, etc. For each registered MIME type in the MIME-queue table, the MIME-queue table indicates a printer queue that is associated with that MIME type. Each printer queue corresponds to a separate printer driver in the printer driver class for the printing device that is associated with the MIME queue table. Multiple different MIME types may be associated with the same or different printer queues.

When a print data stream is received by the printing subsystem, the printing subsystem determines, based on the contents of the print data stream, a MIME type that is associated with the print data stream. The printing subsystem then determines whether the print data stream's associated MIME type is a registered MIME type—a MIME type for which there is a corresponding printer queue in the MIME-queue table for the printing device for which the print data is destined. If the print data stream is associated with a registered MIME type, then the printing subsystem passes the print data to the printer driver that is associated with the print data stream's MIME type, as indicated in the MIME-queue table associated with the destination printing device. Typically, this printer driver will perform little or no rendering relative to the print data stream, because the printing device is capable of understanding and processing the print data stream without such rendering on the part of the printer driver.

Alternatively, if the print data stream is associated with a MIME type that is not registered in the MIME-queue table of the destination printing device, then, in one embodiment of the invention, the printing subsystem passes the print data stream to a designated "preferred" or "default" printer driver for the destination printing device. Under these circumstances, before passing the print data stream on toward the destination printing device, the default printer driver renders the print data stream into a printer definition language that is understood by the destination printing device.

Thus, much of the unnecessary rendering and translation of print data streams by printer drivers is avoided.

Example Print Driver Class

Figure 2:
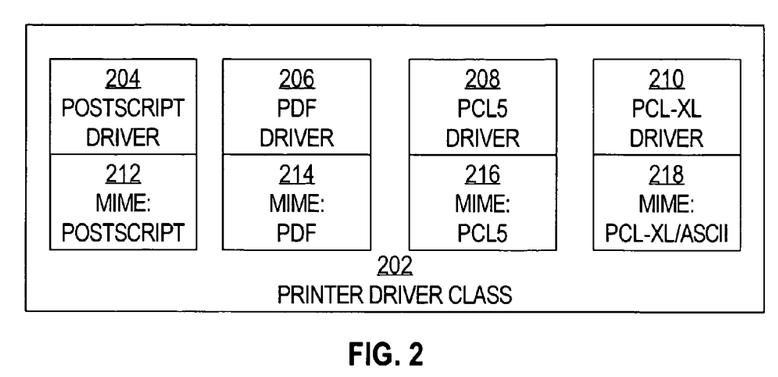
FIG. 2 is a block diagram that depicts an example of a printer driver class that comprises multiple different printer drivers, according to an embodiment of the invention.

FIG. 2 is a block diagram that depicts an example of a printer driver class that comprises multiple different printer drivers, according to an embodiment of the invention. Printer driver class 202 comprises Postscript driver 204, PDF driver 206, PCL5 driver 208, and PCL-XL driver 210. In other embodiments of the invention, the printer driver class can comprise more, fewer, and/or different printer drivers than those shown in FIG. 2.

Each of printer drivers 204-210 is associated with a separate set of one or more MIME types. For example, in FIG. 2, Postscript driver 204 is associated with Postscript MIME type 212, PDF driver 206 is associated with PDF MIME type 214, and PCL5 driver 208 is associated with PCL5 MIME type 216. PCL-XL driver 210 is associated with a set of MIME types 218, which comprises both a PCL-XL MIME type and an ASCII MIME type. The MIME types associated with a particular print driver are those types that the particular print driver supports.

Example Printer Class Queue

Figure 3:
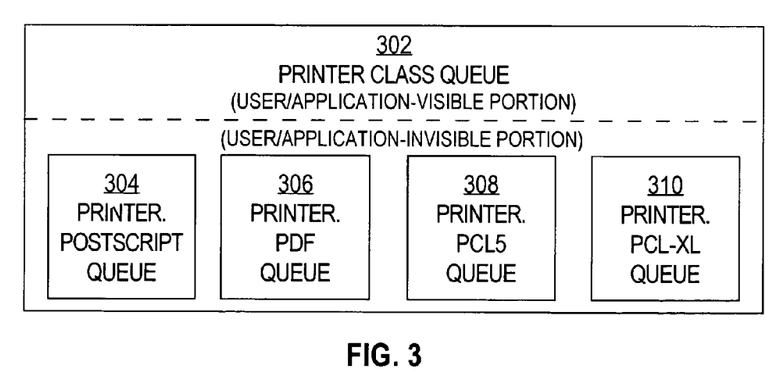
FIG. 3 is a block diagram that depicts an example of a printer class queue that comprises multiple different printer drivers, according to an embodiment of the invention.

FIG. 3 is a block diagram that depicts an example of a printer class queue that comprises multiple different printer drivers, according to an embodiment of the invention. Printer class queue 302 comprises multiple printer queues. Among the printer queues that printer class queue 302 comprises are Postscript queue 304, PDF queue 306, PCL5 queue 308, and PCL-XL queue 310. According to one embodiment of the invention, there is a separate printer queue for each print driver within printer driver class 202 shown in FIG. 2. In other embodiments of the invention, the printer class queue can comprise more, fewer, and/or different printer queues than those shown in FIG. 3.

In one embodiment of the invention, when printer driver class 202 is installed as a driver for a printer, the installation software creates a separate printer queue for each print driver within printer driver class 202. In one embodiment of the invention, printer class queue 302 comprises two portions: a first portion that is visible to users and applications, and a second portion that is visible to a computer's printing system only. In one embodiment of the invention, all of the printer queues, including printer queues 304-310, are in the second portion of printer class queue 302. Thus, the separate nature of printer queues 304-310 may be obscured from a user; all of printer queues 304-310 may be made to appear, to users and applications, as a single printer class queue. Thus, users and applications do not need to deal specifically with which queue a print data stream ought to be assigned. The printing system can handle such details automatically, based on the MIME types of the data represented in the print data streams.

Example Mime-Queue Tables

Figure 4:
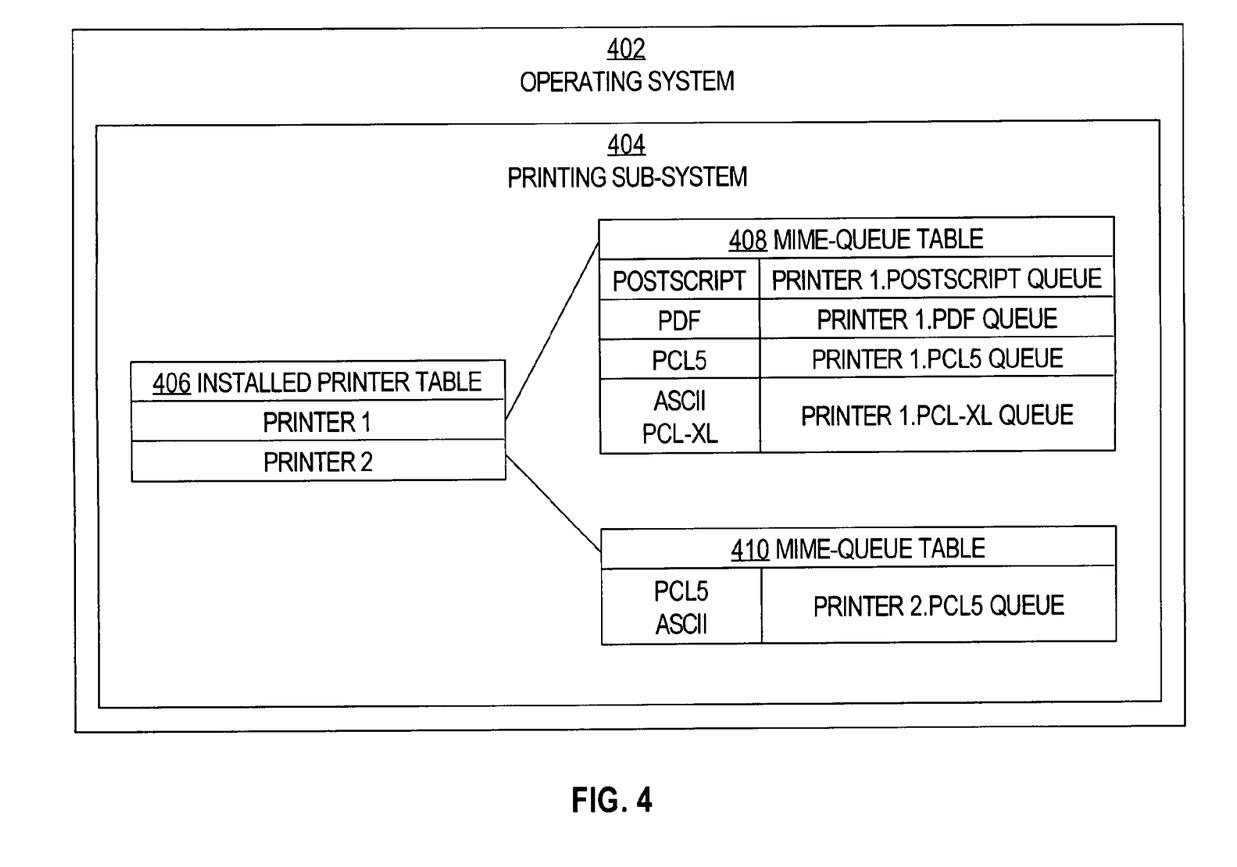
FIG. 4 is a block diagram that depicts an example of the relationships between printing devices and MIME-queue tables, according to an embodiment of the invention.

FIG. 4 is a block diagram that depicts an example of the relationships between printing devices and MIME-queue tables, according to an embodiment of the invention. In the example system shown in FIG. 4, operating system 402 comprises printing sub-system 404. Printing sub-system 404 comprises an installed printer table 406 and separate MIME-queue tables 408 and 410.

In the example of FIG. 4, installed printer table 406 comprises separate entries for two printers: Printer 1 and Printer 2. According to one embodiment of the invention, each of these entries is established at the time that the corresponding printer driver class for that entries' printing device is installed. Each of these entries corresponds to and is associated with a separate MIME-queue table. The entry for Printer 1 corresponds to MIME-queue table 408. The entry for Printer 2 corresponds to MIME-queue table 410.

Each of MIME-queue tables 408 and 410 comprises a separate entry for each printer queue that the printer driver class for the corresponding printing device supports. In the example of FIG. 4, MIME-queue table 308 comprises entries for a Postscript queue, a PDF queue, a PCL5 queue, and a PCL-XL queue. Each entry is associated with a set of one or more corresponding MIME types. For example, the PCL-XL queue is associated with a set of MIME types that includes the ASCII MIME type and the PCL-XL MIME type. Additionally, in the example of FIG. 4, MIME-queue table 410 comprises an entry for a PCL5 queue, which is associated with a set of MIME types that includes the PCL5 MIME type and the ASCII MIME type.

According to one embodiment of the invention, when a printer driver class is installed, the MIME-queue table for that printer driver class is created and stored on a persistent storage device such as a hard disk driver. For example, the MIME-queue table for each printer driver class can be stored in a directory specified by printing sub-system 404.

In one embodiment of the invention, the first entry in the MIME-queue table for a particular printing device corresponds to the "default" or "preferred" printer driver for the particular printing device. In one embodiment of the invention, the printer driver class installation program prompts a user to select the "default" or "preferred" printer driver from among the several printer drivers in the printer driver class. The "default" printer driver for a destination printing device is used to handle a print data stream when the MIME type of that print data stream is not found in any of the entries of the MIME-queue table of the destination printing device. An example of a technique for handling print data streams based on the MIME types of those print data streams is discussed in further detail below.

Each printer queue corresponds to a separate printer driver in the printer driver class. Due to the associations between MIME types and printer queues specified in the data structures of FIG. 4, a user can specify only the printing device to which a print data stream should be directed, and the printing sub-system will automatically determine which printer driver should be used to handle the print data stream. Thus, users are spared the burden of specifically designating which printer drivers or printer queues should be used to handle a print data stream.

Example Technique

Figure 5:
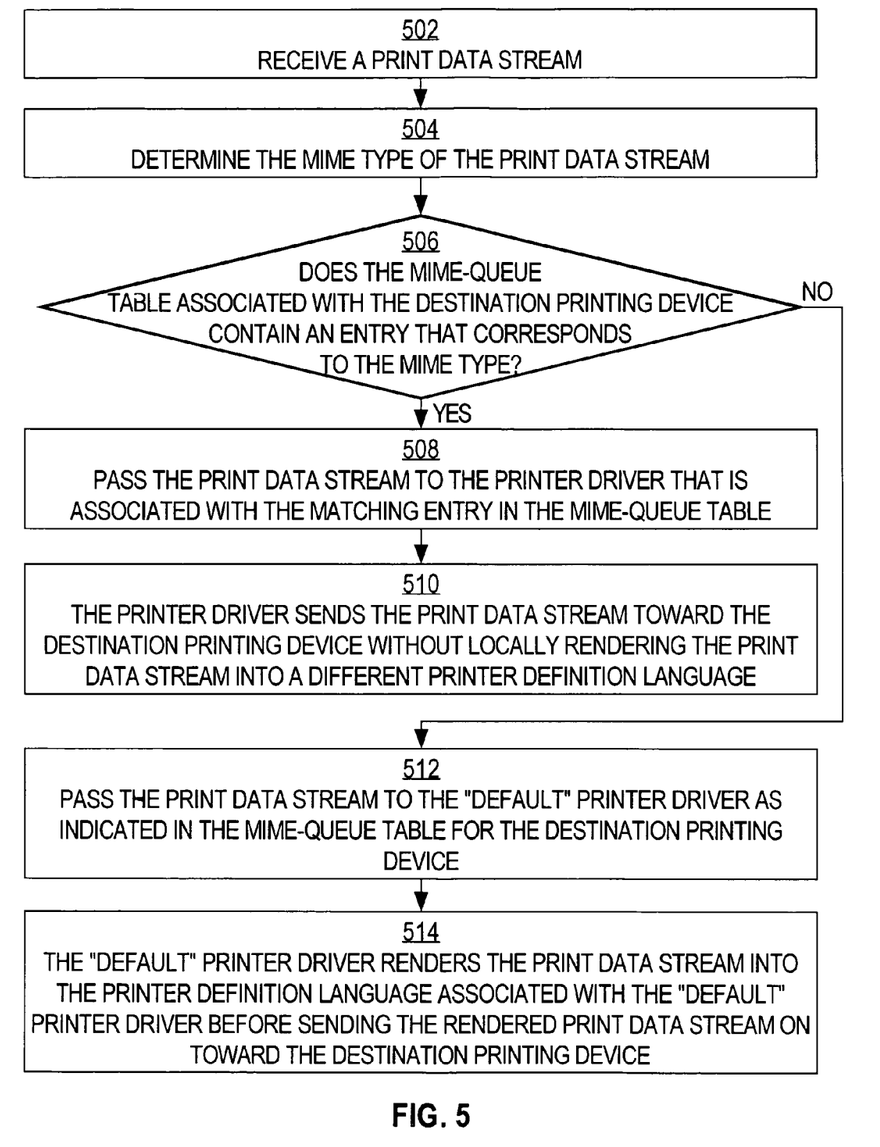
FIG. 5 is a flow diagram that depicts an example of a technique for automatically selecting, based on the MIME type of a print data stream, a printer driver to handle the print data stream, according to an embodiment of the invention.

FIG. 5 is a flow diagram that depicts an example of a technique for automatically selecting, based on the MIME type of a print data stream, a printer driver to handle the print data stream, according to an embodiment of the invention. For example, the depicted technique might be performed by printing sub-system 404 of FIG. 4.

In block 502, a print data stream is received. For example, printing sub-system 404 may receive a print data stream that originated from an application. The print data stream represents content that is to be printed. The content is associated with a MIME type. For example, the content might be a document that is associated with a PDF MIME type. For purposes of simplicity, the MIME type of the content is referred to herein as the MIME type of the print data stream that represents the content.

In block 504, the MIME type of the print data stream is determined. For example, printing sub-system 404 may examine headers and/or fields within the print data stream to determine the MIME type of the print data stream. In many cases, the print data stream expressly indicates the print data stream's MIME type.

In block 506, it is determined whether the MIME-queue table associated with the destination printing device (i.e., the user-specified printing device, to which the print data stream is to be sent) contains an entry that corresponds to the print data stream's MIME type. For example, if the print data stream is determined to have a MIME type of "PDF," and if the print data stream is destined for Printer 1, then printing sub-system 404 may determine whether MIME-queue table 408 contains an entry that corresponds to the PDF MIME type. If the appropriate MIME-queue table comprises a matching entry, then control passes to block 508. Otherwise, control passes to block 512.

In block 508, the print data stream is passed to the printer driver that is associated with the matching entry in the MIME-queue table. For example, if the print data stream's MIME type is PDF, and the matching entry indicates that the corresponding queue is the PDF queue for Printer 1, then the print data stream is passed to the PDF queue for handling and rendering by the PDF printer driver in the printer driver class for Printer 1.

In block 510, the printer driver sends the print data stream toward the destination printing device without locally rendering or translating the print data stream. For example, if the PDF printer driver receives a print data stream that is of the PDF MIME type, then the PDF printer driver sends the print data stream to the destination printing device without translating the print data stream into a printer definition language other than the PDF language. The print data stream remains in the PDF language because the destination printing device is able to understand and process the PDF language. Thus, no non-essential rendering or translation needs to be performed.

Alternatively, in block 512, the print data stream is passed to the "default" or "preferred" printer driver indicated in the MIME-queue table for the destination printing device. For example, if the print data stream's MIME type is a MIME type for which there is no matching entry in the appropriate MIME-queue table, and if the destination printer is Printer 1, then the print data stream is passed to the Postscript queue for handling and rendering by the Postscript printer driver in the printer driver class for Printer 1.

In block 514, the "default" printer driver renders or translates the print data stream into the printer definition language associated with the "default" printer driver for the destination printing device before sending the rendered print data stream on toward the destination printing device. For example, if the "default" Postscript printer driver receives a print data stream whose MIME type is not in the appropriate MIME-queue table, then the Postscript printer driver renders or translates the print data stream into Postscript and then sends the Postscript print data stream to the destination printing device.

Example System

Figure 6:
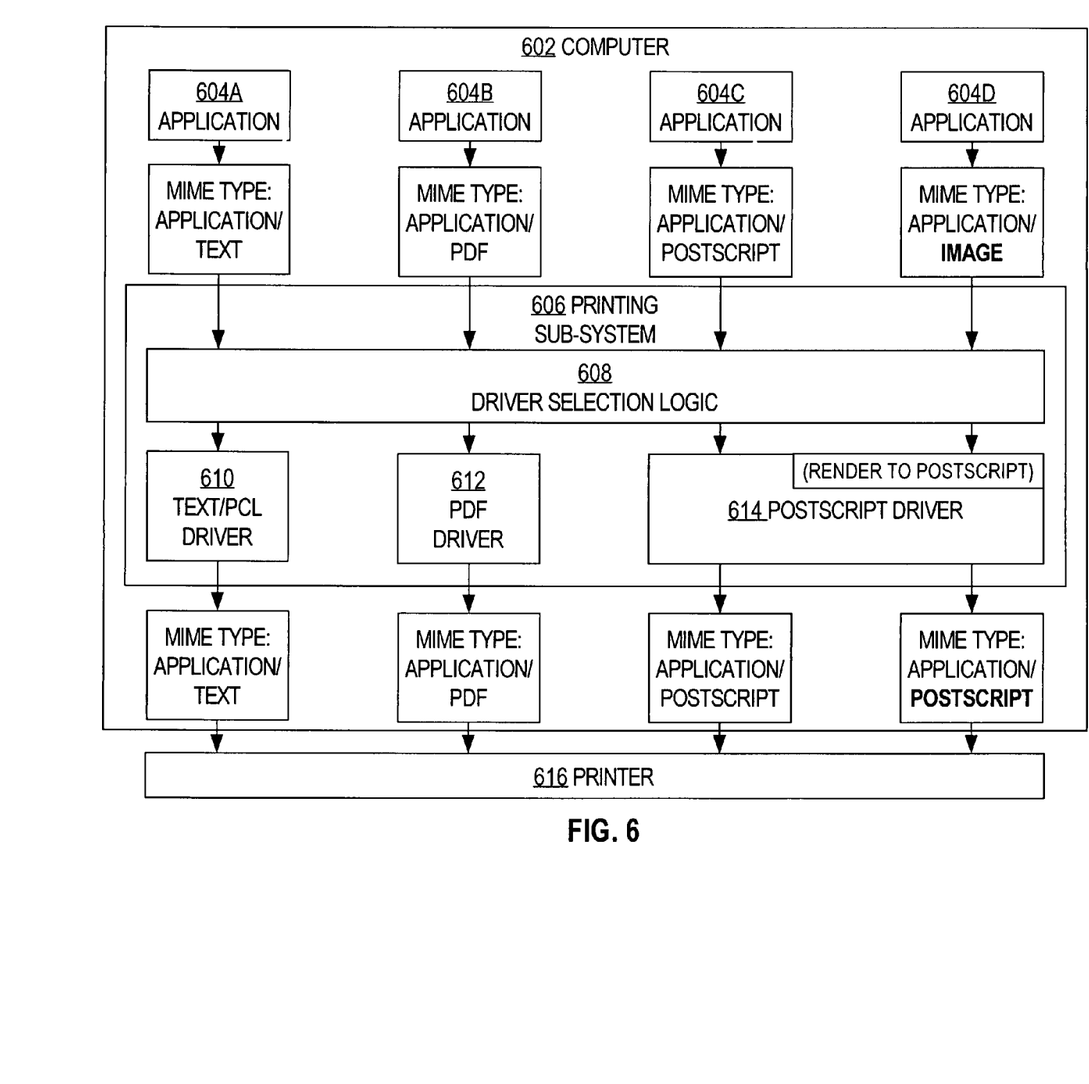
FIG. 6 is a block diagram that depicts an example of a system in which a printer driver is automatically selected, based on the MIME type of a print data stream, to handle the print data stream, according to an embodiment of the invention.

FIG. 6 is a block diagram that depicts an example of a system in which a printer driver is automatically selected, based on the MIME type of a print data stream, to handle the print data stream. In the system of FIG. 6, there is a computer 602. Applications 604A-D execute on computer 602. Additionally, printing sub-system 606 resides on computer 602. Printing sub-system 606 comprises driver selection logic 608. In one embodiment of the invention, driver selection logic comprises installed printer table 406 and MIME-queue tables 408 and 410 such as are shown in FIG. 4. Printing sub-system 606 additionally comprises Text/PCL driver 610, PDF driver 612, and Postscript driver 614. Computer 602 is connected to and communicates with printer 616.

For purposes of example, when application 604A submits, to printing sub-system 606, a print data stream with a MIME type of "Application/text," driver selection logic 608 determines, based on the MIME-queue table for printer 616, that the print data stream should be sent to Text/PCL driver 610. Text/PCL driver 610 does not render the print data stream. Text/PCL driver 610 passes the print data stream on toward printer 616, which understands the print data stream in its native form.

For another example, when application 604B submits, to printing sub-system 606, a print data stream with a MIME type of "Application/PDF," driver selection logic 608 determines, based on the MIME-queue table for printer 616, that the print data stream should be sent to PDF driver 612. PDF driver 612 does not render the print data stream. PDF driver 612 passes the print data stream on toward printer 616, which understands the print data stream in its native form.

For yet another example, when application 604C submits, to printing sub-system 606, a print data stream with a MIME type of "Application/Postscript," driver selection logic 608 determines, based on the MIME-queue table for printer 616, that the print data stream should be sent to Postscript driver 614. Postscript driver 614 does not render the print data stream. Postscript driver 614 passes the print data stream on toward printer 616, which understands the print data stream in its native form.

Now, for a relatively different example, when application 604D submits, to printing subsystem 606, a print data stream with a MIME type of "Application/image," driver selection logic 608 determines that the MIME-queue table for printer 616 does not contain an entry for that MIME type. Therefore, driver selection logic 608 determines that the "default" or "preferred" print driver, indicated in the MIME-queue table, should be used to handle the print data stream. In this case, the "default" print driver for printer 616 is Postscript driver 614. Therefore, printing subsystem 606 passes the print data stream to Postscript driver 614. In this case, since the print data stream does not already conform to Postscript, Postscript driver 614 renders the print data stream into Postscript, and then sends the rendered Postscript print data stream on to printer 616, which understands Postscript.

Example Installation

In one embodiment of the invention, the installation software for a printing device follows the process described below. First, the installation software prompts a user for the name of the printing device. Next, the installation software receives the name of the printing device from the user. Next, the installation software instructs the printing sub-system to create a separate queue for each printer driver in the printer driver class for the printing device. The printing sub-system creates the appropriate printing queues in response. Next, the installation software prompts the user for the identity of the "default" or "preferred" printer driver. Next, the installation software receives the identity of the "default" printer driver from the user. Finally, the installation software establishes the MIME-queue table entries as described above, registers the printing device, and sets the "default" printer driver to be the printer driver identified by the user.

Implementation Mechanisms

Figure 7:
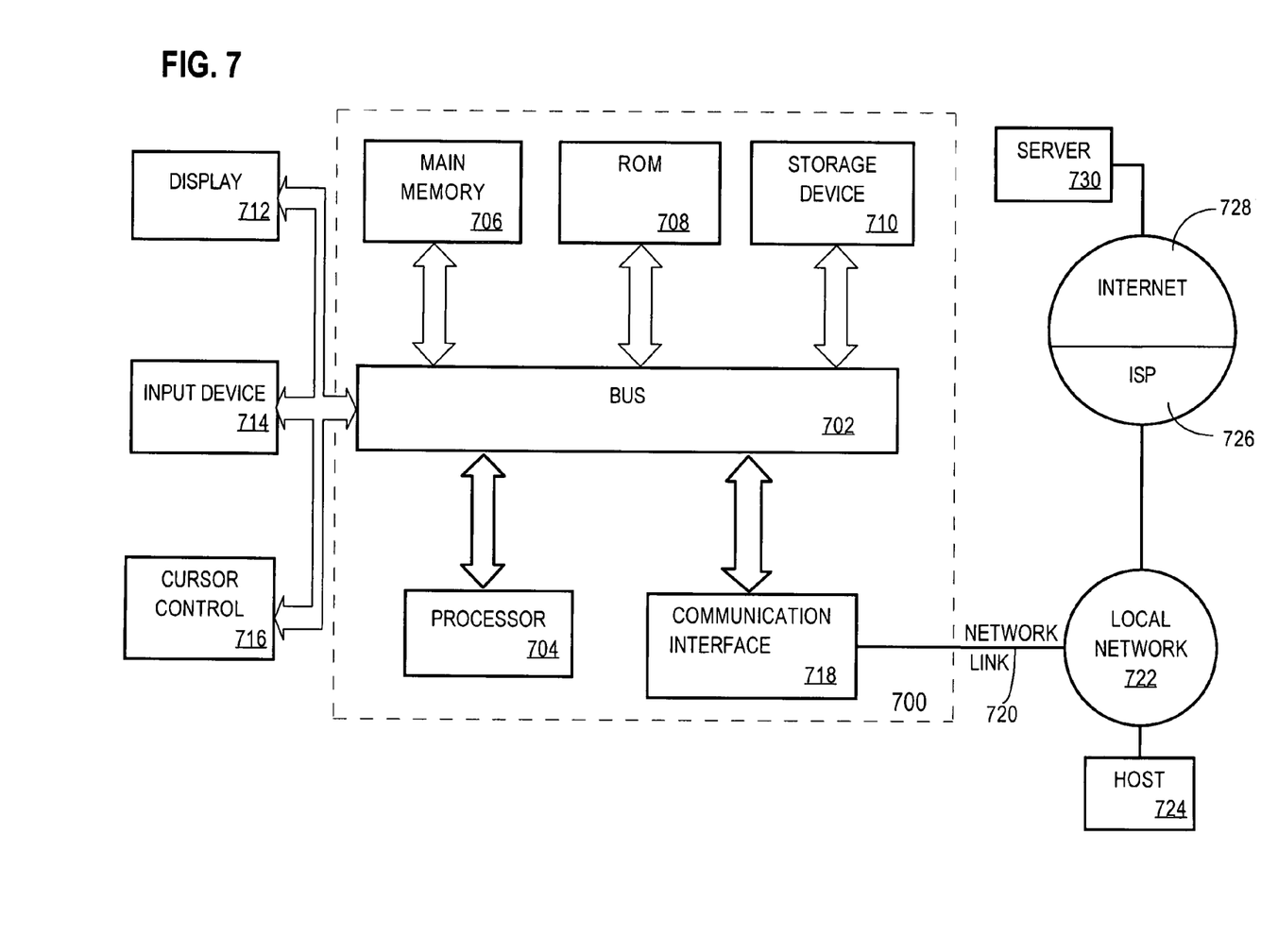
FIG. 7 is a block diagram that depicts a printing device upon which an embodiment of the invention may be implemented.

FIG. 7 is a block diagram that depicts a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), for displaying information to a user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 in a wireless communications architecture. According to one embodiment of the invention, wireless communications are provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a LAN card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the Internet 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for configuring a monitoring system to monitor selected network elements as described herein. Processor 704 may execute the received code as it is received and/or stored in storage device 710 or other non-volatile storage for later execution. In this manner, computer system 700 may obtain application code in the form of a carrier wave.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for processing print data, the method comprising:
   receiving, at a printing sub-system, a print data stream that is associated with a Multipurpose Internet Mail Extensions (MIME) type, wherein an application, at the printing sub-system, sends sent the print data stream toward a destination printing device;
   determining, at the printing sub-system, the MIME type of the print data stream;
   determining, at the printing sub-system, whether a MIME-queue table associated with the destination printing device contains an entry that corresponds to the MIME type of the print data stream;
   if the MIME-queue table contains an entry that corresponds to the MIME type of the print data stream, then passing the print data stream to a first printer driver that is associated with the MIME type in the MIME-queue table, wherein the first printer driver does not change the print data stream to conform to any printer definition language before sending the print data stream toward the destination printing device; and
   if the MIME-queue table does not contain an entry that corresponds to the MIME type of the print data stream, then passing the print data stream to a second printer driver that is not associated with the MIME type in the MIME-queue table, wherein the second printer driver changes the print data stream to conform to a printer definition language.

2. The method of claim 1, wherein a first printing device is associated with a first MIME-queue table, wherein a second printing device is associated with a second MIME-queue table that differs from the first MIME-queue table, and wherein the destination printing device is one of the first printing device and the second printing device.

3. A non-transitory computer-readable medium carrying one or more sequences of instructions for processing print data, wherein execution of the one or more sequences of instructions by one or more processors causes the one or more processors to perform the steps of:
   receiving, at a printing sub-system, a print data stream that is associated with a Multipurpose Internet Mail Extensions (MIME) type, wherein an application, at the printing sub-system, sends the print data stream toward a destination printing device;
   determining, at the printing sub-system, the MIME type of the print data stream;
   determining, at the printing sub-system, whether a MIME-queue table associated with the destination printing device contains an entry that corresponds to the MIME type of the print data stream;
   if the MIME-queue table contains an entry that corresponds to the MIME type of the print data stream, then passing the print data stream to a first printer driver that is associated with the MIME type in the MIME-queue table, wherein the first printer driver does not change the print data stream to conform to any printer definition language before sending the print data stream toward the destination printing device; and if the MIME-queue table does not contain an entry that corresponds to the MIME type of the print data stream, then passing the print data stream to a second printer driver that is not associated with the MIME type in the MIME-queue table, wherein the second printer driver changes the print data stream to conform to a printer definition language.

4. The non-transitory computer readable medium of claim 3, wherein a first printing device is associated with a first MIME-queue table, wherein a second printing device is associated with a second MIME-queue table that differs from the first MIME-queue table, and wherein the destination printing device is one of the first printing device and the second printing device.

* * * * *